(12) United States Patent
Bhattacharjee

(10) Patent No.: US 8,527,431 B2
(45) Date of Patent: Sep. 3, 2013

(54) MANAGEMENT OF DATA VIA COOPERATIVE METHOD AND SYSTEM

(76) Inventor: Gaurab Bhattacharjee, North Brunswick, NJ (US)

(*) Notice: Subject to any disclaimer, the term of this patent is extended or adjusted under 35 U.S.C. 154(b) by 298 days.

(21) Appl. No.: 12/948,859

(22) Filed: Nov. 18, 2010

(65) Prior Publication Data

US 2012/0130723 A1    May 24, 2012

(51) Int. Cl.
*G06Q 30/00* (2012.01)
*G06Q 99/00* (2006.01)

(52) U.S. Cl.
USPC .......................................... 705/347; 705/319

(58) Field of Classification Search
None
See application file for complete search history.

(56) References Cited

U.S. PATENT DOCUMENTS

| | | | |
|---|---|---|---|
| 4,827,508 A * | 5/1989 | Shear | 705/53 |
| 5,996,002 A | 11/1999 | Katsurabayashi | |
| 6,314,427 B1 | 11/2001 | Goldman | |
| 6,321,229 B1 | 11/2001 | Goldman | |
| 6,917,938 B2 | 7/2005 | Shea | |
| 7,076,521 B2 | 7/2006 | Davidson | |
| 7,206,790 B2 | 4/2007 | Kodama | |
| 7,765,481 B2 | 7/2010 | Dixon | |
| 2002/0049738 A1* | 4/2002 | Epstein | 707/1 |
| 2003/0009603 A1 | 1/2003 | Ruths | |
| 2003/0014513 A1 | 1/2003 | Ruths | |
| 2003/0197729 A1 | 10/2003 | Denoue | |
| 2005/0102359 A1 | 5/2005 | Russo | |
| 2005/0289039 A1* | 12/2005 | Greak | 705/37 |
| 2006/0253458 A1 | 11/2006 | Dixon | |
| 2006/0253578 A1 | 11/2006 | Dixon | |
| 2006/0253580 A1 | 11/2006 | Dixon | |
| 2006/0253584 A1 | 11/2006 | Dixon | |
| 2007/0143398 A1 | 6/2007 | Graham | |
| 2007/0244906 A1 | 10/2007 | Colton | |
| 2007/0250531 A1 | 10/2007 | Wiggins | |
| 2007/0255674 A1 | 11/2007 | Mahoney | |
| 2008/0086459 A1* | 4/2008 | Ryan | 707/3 |
| 2008/0189213 A1 | 8/2008 | Blake | |
| 2011/0184958 A1* | 7/2011 | Krishnamoorthy et al. | 707/749 |

OTHER PUBLICATIONS

Macnn.com, "Busted Loop offers free access to raw App Store data", Jul. 16, 2009, http://www.macnn.com/articles/09/07/16/free.raw.app.store.data/.*
Rajasekar, et. al., "Storage Broker—Managing Distributed Data in a Grid," San Diego SuperComputer Center, Univ. of Cal. at San Diego.
Rajasekar et al., "Storage Resource Broker—Managing Distributed Data in a Grid", 11 pps., San Diego, CA.

* cited by examiner

*Primary Examiner* — Gerardo Araque, Jr.
*Assistant Examiner* — Paul R Fisher
(74) *Attorney, Agent, or Firm* — Mark Terry

(57) ABSTRACT

A method for managing data in a central repository for a plurality of users over a communications network is disclosed. The method includes assigning a reputation score to a first user based on the interactions of the first user that were logged, the use by other users that was logged and the opinions that were received, assigning permissions to the first user based at least partially on the reputation score of the first user and a reputation score of a business entity to which the first user is associated, allowing the first user to access the central repository, allowing the first user to upload data to the central repository and modify a content model of data in the central repository, and associating a reputation score to data uploaded by the first user based on the reputation score of the first user.

17 Claims, 4 Drawing Sheets

MANAGEMENT OF DATA VIA COOPERATIVE METHOD AND SYSTEM

BACKGROUND OF THE INVENTION

1. Field of the Invention

The present invention relates to the field of data management and, more specifically, the present invention relates to the field of management of data in a cooperative environment over a communications network.

2. Description of the Related Art

With the rise of crowd-sourced databases, wikis and collaborative web sites today, data management in a cooperative environment is a topical subject. Management of data in a central repository to which high numbers of users have access, however, poses a unique set of challenges. Users must be provided with access to the central repository but not unfettered access. Users must be able to upload or update data to the central repository but there must be a mechanism for checking the accuracy or reputation of the data. Data, and its quality, must be protected but subject to change if appropriate. Users with a good reputation must be separated from users with a bad reputation. Likewise, data with high reputation must be separated from data with low reputation. Lastly, there must be a financially feasible way to operate the central repository.

The problems posed above for cooperative data repositories are further compounded when dealing with certain industries, such as the financial services industry. Due to the high volume and high complexity of data associated with the financial services industry, the central repository must be scalable and support increasingly complex types of data. Also, due to the regulatory restrictions of the industry, the central repository must be amenable to management of varying data types.

Various approaches to the problems of cooperative data repositories have been disclosed. One popular approach, often employed by online wikis, involves allowing the crowd to decide how data should be uploaded or updated in the central repository. Any registered user is typically allowed to update data in the wiki's central repository, though the crowd may decide whether the update is appropriate. Thus, after data is uploaded or modified, the crowd is given an opportunity to weigh in on the credibility of the data. Another approach to the problem of data management in a cooperative environment involves the use of ratings provided by a crowd. Often used in online auction sites, the crowd provides ratings on the reputation or credibility of a registered client or provider, such that subsequent users of the system may consider the ratings information when interacting with said client or provider.

These approaches, however, have their drawbacks. One problem with said approaches is their limited profitability. Online wikis, for example, have historically had problems turning a profit, thereby calling into the question the feasibility of such a system. Another problem with said approaches is the lack of the ability to maintain a high quality of the data in the central repository. Since the integrity of the data in the central repository is fundamental to the long term viability of a cooperative data repository, inability to maintain high quality data frustrates the purpose of the system.

Therefore, what is needed is a system and method for improving the problems with the prior art, and more particularly for a more efficient method and system for managing large amounts of data in a central repository to which high numbers of users have access over a communications network.

BRIEF SUMMARY OF THE INVENTION

Embodiments of the present invention address deficiencies of the art in respect to data management and provide a novel and non-obvious method, server and computer program product for managing data in a central repository for a plurality of users over a communications network. In an embodiment of the invention, the steps performed by the method, server and computer program product of the present invention include logging interactions of the first user with the central repository, logging use by other users of data uploaded by the first user, receiving opinions of other users about a reputation of the first user of the plurality of users, assigning a reputation score to the first user based at least partially on the interactions of the first user that were logged, the use by other users that was logged and the opinions that were received, assigning permissions to the first user based at least partially on the reputation score of the first user and a reputation score of a business entity to which the first user is associated, providing a first interface to the first user over the communications network, wherein the first interface allows the first user to access the data in the central repository according to the permissions of the first user, providing a second interface to the first user over the communications network, wherein the second interface allows the first user to upload data to the central repository and modify a content model of data in the central repository according to the permissions of the first user, and associating a reputation score to data uploaded by the first user to the central repository via the second interface, wherein the reputation score of the data is based on the reputation score of the first user and wherein the first interface displays the reputation score of the data that is accessed.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE INVENTION

The present invention improves upon the problems with the prior art by providing a more effective and efficient method and system for managing data content in a cooperative environment over a communications network such as the Internet. The present invention improves over the prior art by assigning permissions to participants in the cooperative data environment based at least partially on the reputation of the participant, as evidenced by: a) the crowd's opinion of the participant, b) the crowd's use of the participant's data and c) the participant's behavior in the database. Similarly, data uploaded or updated in the cooperative data environment is assigned a reputation score proportional to the reputation of the participant that uploaded it. This improves and maintains a high quality of data in the system and separates users with a good reputation from users with a bad reputation. Likewise, this system separates data with high reputation from data with low reputation.

The present invention further improves over the prior art by creating a payment system that results in a financially feasible central repository. Participants pay for consumption of data according to a variety of factors including the amount of data consumed, the quality of data consumed, the amount of data contributed, the quality of the data contributed and the reputation of the participant. This is beneficial as the costs of operating the central repository are passed on to participants according to quantity and type of use. The present invention is further highly scalable and supports complex data types.

Figure 1:
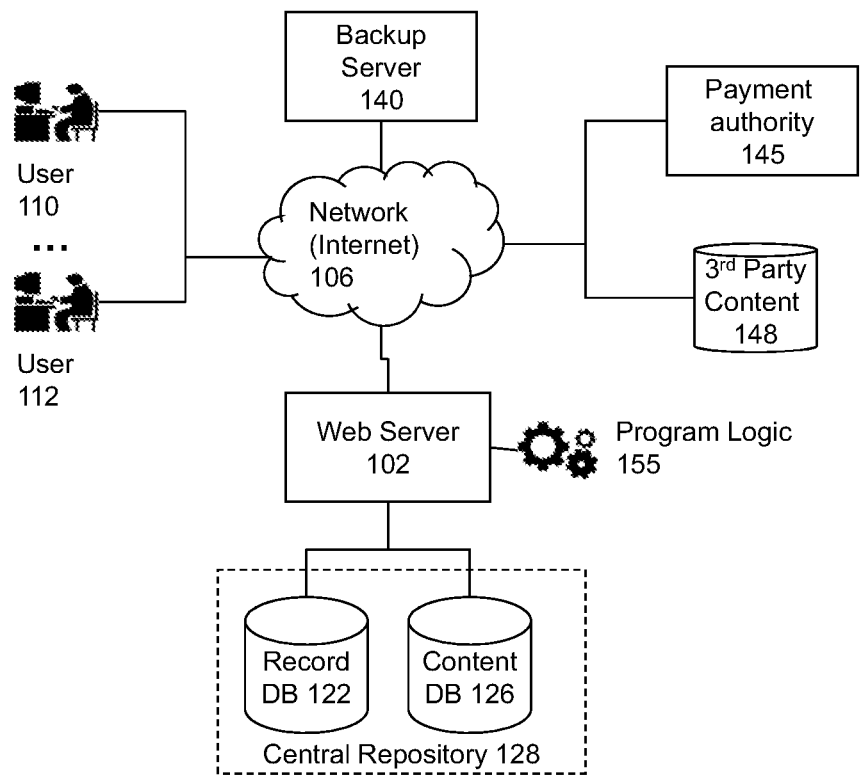
FIG. 1 is a block diagram illustrating a network architecture of a system for managing data in a cooperative environment over a communications network, in accordance with one embodiment of the present invention.

Referring now to the drawing figures in which like reference designators refer to like elements, there is shown in FIG. 1 a block diagram illustrating a network architecture of a system for managing data in a cooperative environment over a communications network, in accordance with one embodiment of the present invention. FIG. 1 shows an embodiment of the present invention wherein users 110-112, each comprising an individual and a computer, interact with server 102 over a network 106, which can be a packet switched network such as the Internet or the World Wide Web. The computer of users 110-112 can be a desktop, a laptop, handheld computer, a smart phone, a tablet computer or the like.

Server 102 is the main operative element of the present invention, executing the steps that comprise the method of the present invention. Server 102 includes a software engine that delivers applications and data content (including text files, HTML files, music files, video files, electronic book files, app files, information files, and any other media content) to users 110-112. Server 102 may also deliver data content to users 110-112 based on search parameters or identifying information selected by the client. The software engine of server 102 may perform other data content delivering processes such as audio or video streaming or any other standard for transferring multimedia data in a stream of packets that are interpreted and rendered, in real time, by a software application as the packets arrive. It should be noted that although FIG. 1 shows only two users 110-112 and one server 102, the system of the present invention supports any number of client users and web servers connected via network 106.

Server 102 includes program logic 155 comprising computer source code, scripting language code or interpreted language code that is compiled to produce computer instructions that perform various functions of the present invention. In one embodiment of the present invention, the program logic is a scripting language. Program logic 155 may reside on a client computer, the server 102 or any combination of the two.

FIG. 1 further shows that server 102 is connected to a user record database 122 and a data content database 126. Database 122 is used to store user records, such as profiles and other user account data, which have been created for each user 110-112. Database 126 stores all data content of the central repository of the present invention. Databases 122 and 126 are collectively referred to as the "data repository" or the "central repository" for all resident data served by server 102 in the present invention. Note that although FIG. 1 shows only two databases 122 and 126, the present invention supports any number of databases holding various types of data that is served by server 102.

FIG. 1 also shows a payment authority 145 to effectuate payments by users 110-112 for data content. In one embodiment of the present invention, the payment authority 145 is a payment gateway, which is an e-commerce Application Service Provider (ASP) service that authorizes payments for individuals, e-businesses, online retailers, or traditional brick and mortar businesses. A payment gateway is the equivalent of a physical point-of-sale terminal located in most retail outlets. Payment gateways encrypt sensitive information, such as credit card numbers, to ensure that information passes securely between the customer and the merchant. A payment gateway facilitates the transfer of information between a payment portal (such as a website) and the acquiring bank, quickly and securely. When a customer orders a product or service from a payment gateway enabled merchant, the payment gateway performs a variety of tasks to process the transaction. Payment gateways accept payment via the use of credit cards, charge cards, bank cards, gift cards, account cards, etc.

FIG. 1 also shows a third party data content provider 148, which may provide additional data content. Lastly, FIG. 1 shows a backup server 140 which makes copies of data on server 102 and/or its associated databases 122 and 126, so that these additional copies may be used to restore the original after a data loss event. The backup server 140 may be used to restore a state following a disaster or to restore small numbers of files after they have been accidentally deleted or corrupted.

Note that although server 102 is shown as a single and independent entity, in one embodiment of the present invention, the functions of server 102 may be integrated with the functions of another entity, such as entities 140, 145, and 148 of FIG. 1. Further server 102 and its functionality, according to a preferred embodiment of the present invention, can be realized in a centralized fashion in one computer system, or in a distributed fashion where different elements are spread across several interconnected computer systems.

Figure 2:
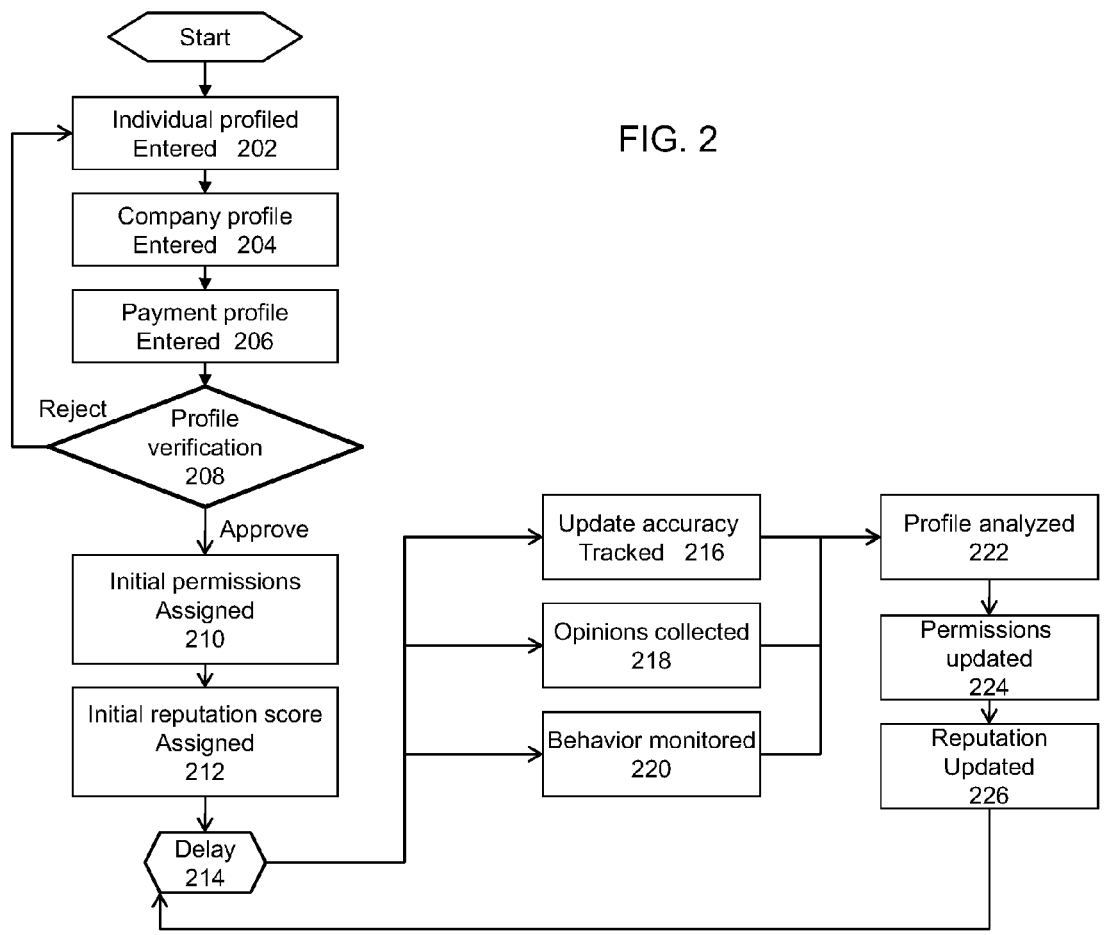
FIG. 2 is a flow chart describing the control flow of the process for setting up and maintaining an account with the server over a communications network, in accordance with one embodiment of the present invention.

FIG. 2 is a flow chart describing the control flow of the process for setting up and maintaining an account with server 102 over a communications network (i.e., network 106), in accordance with one embodiment of the present invention. The flow chart of FIG. 2 describes the process undertaken by a first user seeking to participate in the cooperative data management system of the present invention. The flow chart of FIG. 2 is described in association with FIG. 1.

In a first step 202, server 102 provides a graphical user interface to the first user for the purpose of collecting individual profile data of the first user, including the user's name, address, telephone number, location, URL, email address, age, sex, preferences, employment affiliation, job description, regulatory reputation description and a list of keywords or tags associated with the user or any of the above items. In step 204, server 102 provides a graphical user interface to the first user for the purpose of collecting company profile data pertaining to the company, organization or business entity to which the first user belongs, including the entity's name, address, telephone number, location, URL, description, regulatory reputation and a list of keywords or tags associated with the company or any of the above items.

In step 206, the server provides a graphical user interface to the first user to select a payment plan and enter payment profile information that is processed by payment authority 145. The particular user may select from a variety of payment plans such as paying a periodical subscription fee, a pay-as-you-go plan, a one-time fee, a usage plan or any combination of the above. Subsequent to step 206, server 102 generates a profile for the particular user based on the data garnered in steps 202-206 and stores it in database 122 of the central repository 128. The profile may be stored in record database 122, including pointers or addresses for associated content in content database 126 and/or content database 148. Upon storage of the profile, the server 102 indexes the profile of the first user to facilitate searching of the profile.

In step 208, the profile data entered by the particular user in steps 202-208 are verified. This step may include a process whereby certain information, such as the veracity of the personal data entered by the first user, is verified by a third party such as a data aggregation company. This step may further include a process whereby certain information, such as the reputation of the business entity or organization entered by the first user, is looked up (such as with a third party data company) and stored. If verification is effectuated, control flows to step 210. Otherwise, control flows back to step 202 where the first user may re-enter the profile data.

In step 210, server 102 assigns permissions to the first user based at least partially on one or more of the following: a default reputation score of the first user, a reputation score of the business entity to which the first user belongs, a reputation score of an associate of the first user, historical data associated with the first user or any combination of the above. Permissions comprise authorization of the first user to read data in the central repository 128, write data to the central repository 128, modify existing data in the central repository 128 and execute data in the central repository 128.

In step 212, server 102 assigns a reputation score to the particular user. "Reputation" pertains to the reputation or credibility of a particular user. The reputation score assigned to the particular user is based at least partially on one or more of the following: a predefined default value, an amount of payment of the particular user in step 206, a reputation score of the business entity to which the user belongs, a reputation score of an associate of the first user, historical data associated with the first user or any combination of the above. The reputation score of the first user is associated with the user's profile in database 122 of the central repository 128. In one example, a reputation score will be a number between 1 and 10. The reputation score can be the sum of the individual reputation score assigned to each variable considered in assessing the reputation score of the first user. The higher the reputation score of a particular user, the higher the reputation or credibility of a particular user and the data he uploads to the central repository.

In step 214, a period of time passes. Subsequently, steps 216, 218 and 220 are performed in parallel. In step 216, the accuracy of the first user's updates to data in the central repository 128 is tracked and logged in the central repository 128. Specifically, the use by other users 110-112 of the data uploaded by the first user is logged. As others use the data uploaded by the first user, this indicates the veracity and high quality of the data the first uploaded. Likewise, if the data uploaded by the first user is not used or accessed by others, this indicates the low quality of the data he uploaded. The data logged in step 216 may be processed and a single value indicating the accuracy of the data uploaded by the first user may be calculated.

In one embodiment of the present invention, a value is awarded to the first user when another user consumes the data uploaded by the first user. The value awarded is proportional to a variety of factors, such as the amount and type of use (by the other user) of the first user's data, the reputation of the user consuming the data uploaded by the first user, the reputation of the business entity associated with the user consuming the data and opinions provided by other users about the quality of the data uploaded by the first user. As additional users consume the data uploaded by the first user, additional values are awarded to the first user. All values awarded to the first user are summed to produce a total value. A higher total value indicates the veracity and high quality of the data the first uploaded. A lower total value indicates the low quality of the data he uploaded.

In step 218, server 102 provides a graphical user interface to a set of registered users, such as users 110-112, for the purpose of collecting opinions from the users about the reputation associated with the first user. The crowd of users provides their opinion on the reputation of a first user via the graphical user interface, wherein each user's opinion is based on his or her experience with the first user or the data the first user has contributed to the system. In one example, each member of the crowd of users provides a number between zero and ten, wherein zero indicates low reputation and ten indicates high reputation. The opinions provided by the crowd of users may be compiled and processed to calculate a single value indicating the reputation of the first user.

In step 220, the behavior of the first user with regard to the data in the central repository 128 is monitored and logged in the central repository 128. Specifically, the amount and frequency of the first user's access of data in the central repository, upload of data to the central repository and modification of data in the central repository is monitored and logged. More specifically, the type and quality of data accessed by the first user and the type and quality of data uploaded by the first user is monitored and logged. In general, contributions to the central repository weigh in favor of a finding of "good" behavior of the first user with regard to the central repository. Likewise, consumption (without corresponding or in-kind contributions) of data in the central repository weigh in favor of a finding of "bad" behavior of the first user with regard to the central repository. The data logged in step 220 be compiled and processed to calculate a single value indicating the behavior of the first user with regard to the central repository.

In step 222, the profile data of the first user is processed and analyzed. Specifically, the data garnered in steps 216, 218 and 220 are processed in order to determine how the first user's reputation and permissions will be modified. Positive values indicating high data accuracy from step 216, good reputation from step 218 and good behavior from step 220 will weigh in favor of increasing the first user's reputation and permissions. On the other hand, negative values indicating low data accuracy from step 216, bad reputation from step 218 and bad behavior from step 220 will weigh in favor of decreasing the first user's reputation and permissions.

In step 224, server 102 modifies the permissions of the first user based at least partially on one or more of the following: the data garnered in steps 216, 218 and 220, the first user's previous permissions, the reputation score of the first user, an amount of payment of the first user in step 206 or since then (see processes of the control flows of FIG. 3 and FIG. 4), a reputation score of an associate of the first user, a reputation score of the business entity to which the first user belongs, and historical data associated with the first user.

In step 226, server 102 modifies the reputation score of the first user, based at least partially on one or more of the following: data garnered in steps 216, 218 and 220, the first user's previous permissions and reputation score, the first user's permissions updated in step 224, an amount of payment of the particular user in step 206 or since then (see processes of the control flows of FIG. 3 and FIG. 4), a reputation score of an associate of the first user, a reputation score of the business entity to which the first user belongs, and historical data associated with the first user.

Subsequently, control flows back to step 214 and steps 216-226 are continually repeated. In this fashion, the reputation score of the first user is periodically updated to reflect the updated data garnered in steps 216, 218 and 220. Likewise, the permissions of the first user are periodically updated to reflect the updated data garnered in steps 216, 218 and 220. In one embodiment, the permissions of the first user are periodically updated to reflect the updated reputation score of the first user and the updated reputation score of the business entity to which the first user belongs. In another embodiment, the reputation score of data uploaded by the first user is periodically updated to reflect the updated reputation score of the first user.

Figure 3:
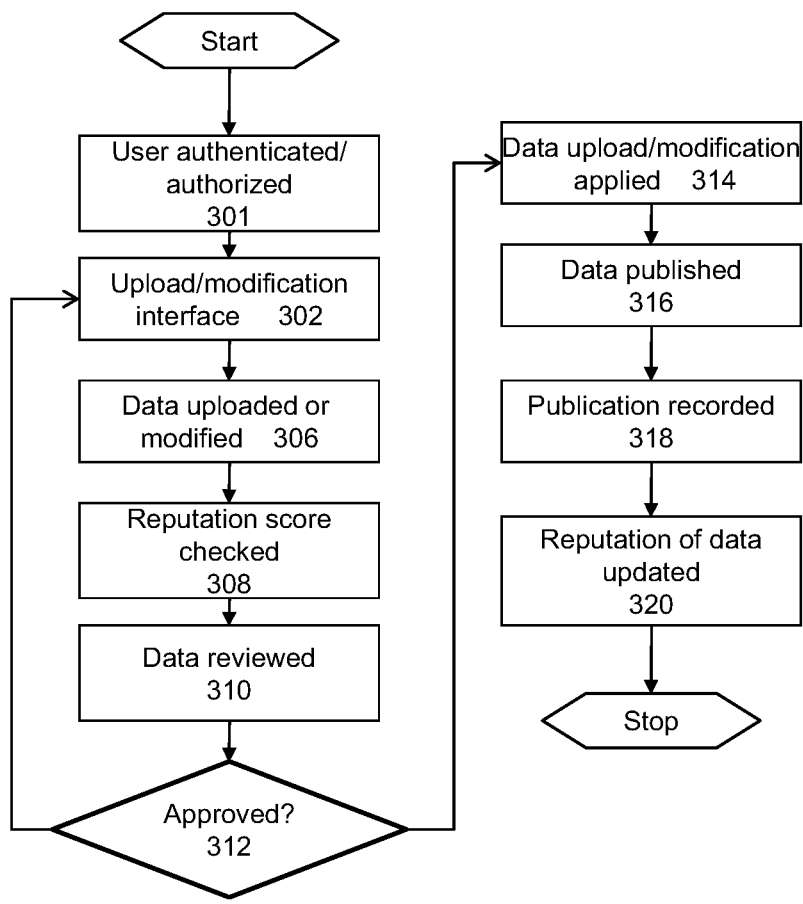
FIG. 3 is a flow chart describing the control flow of the process for a user to upload data to the central repository over a communications network, in accordance with one embodiment of the present invention.

FIG. 3 is a flow chart describing the control flow of the process for a first user to upload to or modify data in the central repository 128 over a communications network, in accordance with one embodiment of the present invention. The flow chart of FIG. 3 describes the process undertaken by the first user seeking to contribute data to the cooperative data management system of the present invention. The flow chart of FIG. 3 is described in association with FIG. 1.

In a first step 301, server 102 executes an authentication process wherein the first user is authenticated and is provided authorization to access and modify data in the central repository 128 based on the permissions assigned to the first user in the record database 122. In step 302, server 102 provides a graphical user interface to the first user for the purpose of uploading data and/or modifying content data or the content model in the central repository 128. The first user may select already existing data or an existing content model in the central repository 128 for updating or modifying. The first user may also select data, such as a file, to upload to the central repository 128. The first user may further select or specify metadata about the data being uploaded, such as data type, data category, size, etc.

In step 306, the data of the first user is uploaded to database 126 of the central repository 128 for review. In this step, the first user may upload, via network 106, data content in his possession. The data content uploaded by the first user may be stored in content database 126 with an association to the profile of the user in database 122. Alternatively, the first user may select data content available to the user from third party content provider 148. The third party content provider 148 may make certain content available to the first user for pay while other content is available free of charge. Upon storage of the uploaded content, the server 102 indexes the data content based on its substance. Note that the data uploaded in step 306 is assigned a provisional status as it must be reviewed (in step 310) and approved by users 110-112 before it is permanently applied to the central repository 128.

In one alternative to step 306, the content model sought to be modified by the first user is specified and/or uploaded. The content model of data refers to the structure of data. In this step, the first user may specify how a particular content model may be modified. Note that the content model modified in step 306 is assigned a provisional status as it must be reviewed and approved by users 110-112 before it is permanently applied to the central repository 128.

In step 308, server 102 checks the reputation score of the first user in the user's profile in record database 122 and associates the same reputation score to the data uploaded or modified in step 306. In step 310, the data uploaded or modified in step 306 is published for review by other users, such that the group of users 110-112 may weigh in on the accuracy or veracity of the data uploaded by the first user. Also, the publication of the uploaded data may be recorded in association with the first user in central repository 128. If the data uploaded or modified by the first user is approved in step 312, then control flows to step 314. Otherwise, control flows back to step 302. Additionally, the approval of the uploaded/modified data may be recorded in association with the first user in central repository 128.

In step 314, the data uploaded/modified in step 306 is permanently applied to central repository 128. In step 316, the data uploaded/modified in step 306 is published and in step 318 the server 102 makes a record in the first user's profile of the publication of the data. In step 320, the reputation score of the uploaded/modified data is updated to be equal or proportional to the reputation score of the first user. In one embodiment, the reputation score of data uploaded by the first user is periodically updated to reflect the updated reputation score of the first user (see control flow of FIG. 2). Subsequently, the control flow of FIG. 3 ceases.

Figure 4:
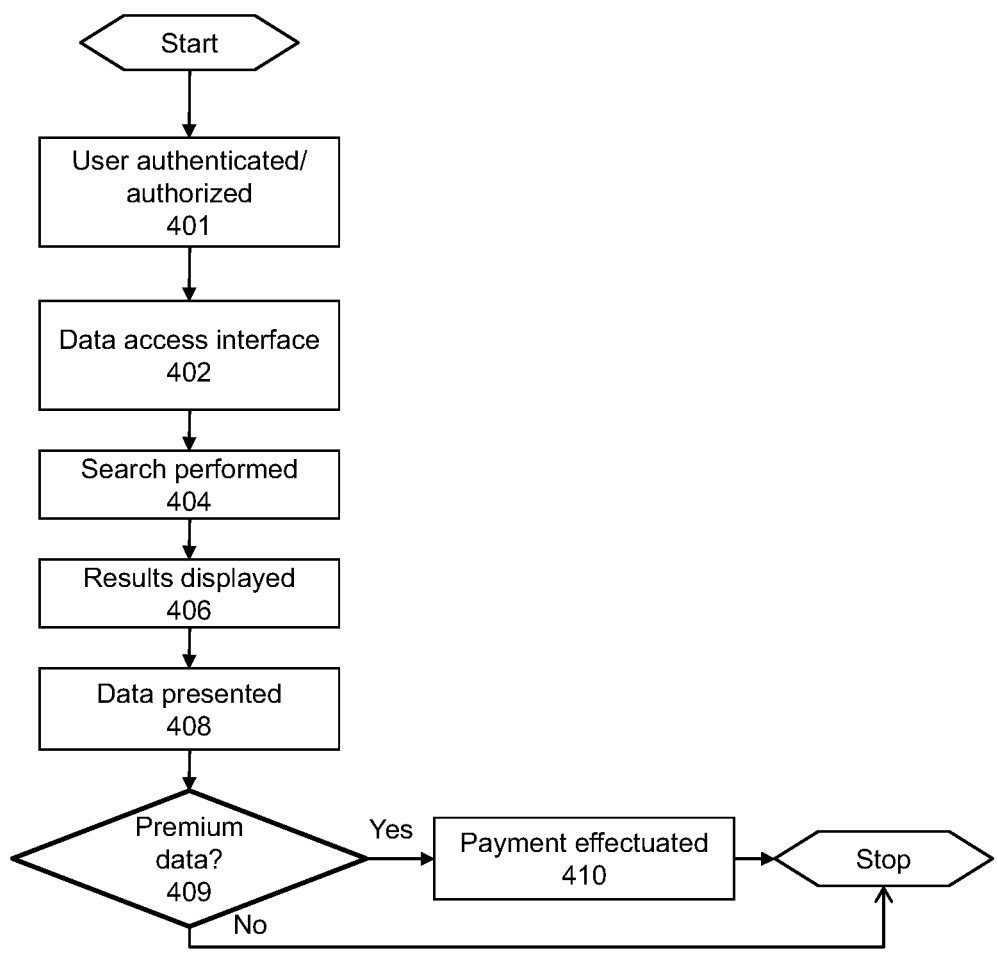
FIG. 4 is a flow chart describing the control flow of the process for a user to consume data content over a communications network, in accordance with one embodiment of the present invention.

FIG. 4 is a flow chart describing the control flow of the process for a user to consume data content over a communications network, in accordance with one embodiment of the present invention. The flow chart of FIG. 4 describes the process undertaken by a first user when seeking to consume data content, as well as its purchase, using the system of the present invention. The flow chart of FIG. 4 is described in association with FIG. 1.

In a first step 401, server 102 executes an authentication process wherein the first user is authenticated and is provided authorization to access data in the central repository 128 based on the permissions assigned to the first user in the record database 122. In step 402, server 102 provides a graphical user interface to the first user for the purpose of allowing the first user to search for and view data content in the central repository 128. The first user may enter search parameters into the graphical user interface, wherein the search parameters may include text that defines a variety of data, such as type, category, individual names, a list of keywords associated with certain data content, etc. In step 404, server 102 performs a search of the index of data content based on the search parameters entered by the first user.

In step 406, the server 102 may present, via the graphical user interface, one or more lists of data content that matched the search parameters. The first user may browse the data content via the graphical user interface. Specifically, the first user may select data content for viewing and/or playing. In step 408, upon detecting a click or other user interaction with the graphical user interface, the server 102 presents or plays the selected data content for the first user via the graphical user interface.

In step 409, if the data content being viewed by the first user is deemed premium or refined data, then control flows to step 410. Otherwise, control flows to termination of the process.

In step 410, the consumer 112 may input electronic payment information (such as name, address, credit card information) into the graphical user interface for payment for purchase of selected data content. Subsequently, the payment authority 145 receives the electronic payment information and credits the particular user for such payment.

In one embodiment of the present invention, payment in step 410 is required for accessing refined data from the central repository 128 though payment is not required for accessing raw data. Raw data is defined as data collected on source which has not been subjected to processing or any other manipulation while refined data is defined as data that has been subjected to processing. The characteristic of being "refined" data may act on a sliding scale indicating various levels of refinement. In another embodiment, an amount of the payment of step 410 is proportional to a refined value of the data that is accessed. In one alternative, the amount of payment of step 410 is reduced in proportion to an amount and quality of data that is uploaded to the central repository 128 by the first user. In another alternative, the amount of payment of step 410 is increased in proportion to an amount and quality of data that is previously accessed by the first user from the central repository 128.

The present invention can be realized in hardware, software, or a combination of hardware and software in the system described in the figures above. A system according to a preferred embodiment of the present invention can be realized in a centralized fashion in one computer system or in a distributed fashion where different elements are spread across several interconnected computer systems. Any kind of computer system—or other apparatus adapted for carrying out the methods described herein—is suited. A typical combination of hardware and software could be a general-purpose computer system with a computer program that, when being loaded and executed, controls the computer system such that it carries out the methods described herein.

An embodiment of the present invention can also be embedded in a computer program product, which comprises all the features enabling the implementation of the methods described herein, and which—when loaded in a computer system—is able to carry out these methods. Computer program means or computer program as used in the present invention indicates any expression, in any language, code or notation, of a set of instructions intended to cause a system having an information processing capability to perform a particular function either directly or after either or both of the following: a) conversion to another language, code or, notation; and b) reproduction in a different material form.

A computer system may include, inter alia, one or more computers and at least a computer readable medium, allowing a computer system, to read data, instructions, messages or message packets, and other computer readable information from the computer readable medium. The computer readable medium may include non-volatile memory, such as ROM, Flash memory, Disk drive memory, CD-ROM, and other permanent storage. Additionally, a computer readable medium may include, for example, volatile storage such as RAM, buffers, cache memory, and network circuits.

In this document, the terms "computer program medium," "computer usable medium," and "computer readable medium" are used to generally refer to media such as main memory removable storage drive, a hard disk installed in hard disk drive, and signals. These computer program products are means for providing software to the computer system. The computer readable medium allows the computer system to read data, instructions, messages or message packets, and other computer readable information from the computer readable medium. The computer readable medium, for example, may include non-volatile memory, such as Floppy, ROM, Flash memory, Disk drive memory, CD-ROM, and other permanent storage. It is useful, for example, for transporting information, such as data and computer instructions, between computer systems.

Although specific embodiments of the invention have been disclosed, those having ordinary skill in the art will understand that changes can be made to the specific embodiments without departing from the spirit and scope of the invention. The scope of the invention is not to be restricted, therefore, to the specific embodiments. Furthermore, it is intended that the appended claims cover any and all such applications, modifications, and embodiments within the scope of the present invention.

I claim:

1. A server for managing data in a central repository for a plurality of users over a communications network, comprising a processor configured for:

accepting profile data of a first user and transmitting the profile data to a third party for verification;

receiving from the third party, over the communications network, a verification of the profile data of the first user;

responsive to receiving a verification of the profile data of the first user, logging interactions of the first user with the central repository over the communications network, calculating a reputation score of the first user based on contributions of the first user to the central repository and consumption of data from the repository by the first user, and assigning the reputation score to a first value;

logging use by other users, over the communications network, of data uploaded by the first user and calculating a second value based on: a) consumption by other users of the data uploaded by the first user, b) an amount of data consumption by other users of the data uploaded by the first user, c) a type of data uploaded by the first user, which data is consumed by other users and d) a reputation score of the other users consuming the data uploaded by the first user;

receiving, over the communications network, opinions of other users about a reputation of the first user of the plurality of users and calculating a third value based on the opinions of the other users about the first user;

receiving, over the communications network, verification by a third party of the data uploaded by the first user, and calculating a fourth value based on the verification;

calculating a quality score for the data uploaded by the first user based at least partially on the first value, the second value, the third value and the fourth value;

assigning permissions to the first user based at least partially on the reputation score of the first user, the quality score of the data uploaded by the first user and a reputation score of a business entity to which the first user is associated in the profile data of the first user;

providing a first interface to the first user over the communications network, wherein the first interface allows the first user to access the data in the central repository according to the permissions of the first user;

providing a second interface to the first user over the communications network, wherein the second interface allows the first user to upload data to the central repository and modify a content model of data in the central repository according to the permissions of the first user;

associating a provisional status to the data uploaded by the first user via the second interface, and receiving, over the communications network, opinions of other users about a quality of the data uploaded by the first user via the second interface;

responsive to receiving a predefined number of acceptances from other users of the data uploaded by the first user via the second interface upgrading the status of the data uploaded by the first users via the second interface; and
assigning a monetary value to the data uploaded by the first user, wherein a size of the monetary value is calculated based on an amount of data that is accessed from the central repository by the first user, a quality of the data that is accessed from the central repository by the first user, an amount of data that is uploaded to the central repository by the first user, a quality of the data that is uploaded to the central repository by the first user a quality of the data that is uploaded to the central repository by the first user.

2. The server of claim 1, wherein the step of receiving opinions further comprises:
providing an interface to the plurality of users over the communications network, wherein the interface solicits opinions of other users about the reputation of the first user of the plurality of users.

3. The server of claim 2, wherein the step of calculating a reputation score further comprises:
calculating a reputation score for the first user based at least partially on at least one of the following: an amount of payment of the first user, a reputation score of an associate of the first user and historical data associated with the first user.

4. The server of claim 3, wherein the step of assigning permissions further comprises:
assigning permissions to the first user based at least partially on at least one of the following: an amount of payment of the first user, a reputation score of an associate of the first user and historical data associated with the first user.

5. The server of claim 4, wherein permissions comprise authorization of a user to read data in the central repository, write data to the central repository, modify existing data in the central repository and execute data in the central repository.

6. The server of claim 5, wherein the processor is further configured for:
receiving a periodical subscription fee from the first user.

7. The server of claim 5, wherein the first interface requires payment from the first user if he accesses refined data from the central repository and does not require payment from the first user if he accesses raw data.

8. The server of claim 5, wherein the first interface requires payment from the first user accessing data from the central repository, wherein an amount of the payment is proportional to a refined value of the data that is accessed.

9. The server of claim 5, wherein any payment required of the first user by the first interface is reduced in proportion to an amount of data that is uploaded to the central repository by the first user via the second interface.

10. The server of claim 5, wherein any payment required of the first user by the first interface is increased in proportion to an amount of data that is accessed from the central repository by the first user via the first interface.

11. The server of claim 5, wherein the processor is further configured for:
periodically modifying the reputation score of the first user based on updated interactions of the first user that were logged, updated use by other users that was logged and updated opinions that were received from other users about the first user.

12. The server of claim 5, wherein the processor is further configured for:
periodically modifying the reputation score of data uploaded by the first user to the central repository via the second interface as the reputation score of the first user changes over time.

13. A server for managing data in a central repository for a plurality of users over a communications network, comprising a processor configured for:
accepting profile data of a first user and transmitting the profile data to a third party for verification;
receiving from the third party, over the communications network, a verification of the profile data of the first user;
responsive to receiving a verification of the profile data of the first user, logging interactions of the first user with the central repository over the communications network, calculating a reputation score of the first user based on contributions of the first user to the central repository and consumption of data from the repository by the first user, and assigning the reputation score to a first value;
logging use by other users, over the communications network, of data uploaded by the first user and calculating a second value based on: a) consumption by other users of the data uploaded by the first user, b) an amount of data consumption by other users of the data uploaded by the first user, c) a type of data uploaded by the first user, which data is consumed by other users and d) a reputation score of the other users consuming the data uploaded by the first user;
receiving, over the communications network, opinions of other users about a reputation of the first user of the plurality of users and calculating a third value based on the opinions of the other users about the first user;
receiving, over the communications network, verification by a third party of the data uploaded by the first user, and calculating a fourth value based on the verification;
calculating a quality score for the data uploaded by the first user based at least partially on the first value, the second value, the third value and the fourth value;
assigning permissions to the first user based at least partially on the reputation score of the first user, the quality score of the data uploaded by the first user and a reputation score of a business entity to which the first user is associated in the profile data of the first user;
providing a first interface to the first user over the communications network, wherein the first interface allows the first user to access the data in the central repository according to the permissions of the first user and wherein the first interface requires authentication of the first user;
providing a second interface to the first user over the communications network, wherein the second interface allows the first user to upload data to the central repository and modify a content model of data in the central repository according to the permissions of the first user;
associating a provisional status to the data uploaded by the first user via the second interface, and receiving, over the communications network, opinions of other users about a quality of the data uploaded by the first user via the second interface;
responsive to receiving a predefined number of acceptances from other users of the data uploaded by the first user via the second interface upgrading the status of the data uploaded by the first users via the second interface; and
assigning a monetary value to the data uploaded by the first user, wherein a size of the monetary value is calculated based on an amount of data that is accessed from the central repository by the first user, a quality of the data that is accessed from the central repository by the first user, an amount of data that is uploaded to the central repository by the first user, a quality of the data that is uploaded to the central repository by the first user a quality of the data that is uploaded to the central repository by the first user.

14. The server of claim 13, wherein the processor is further configured for:
providing an interface to the plurality of users over the communications network, wherein the interface solicits opinions of other users about the reputation of the first user of the plurality of users.

15. The server of claim 14, wherein a reputation score is calculated for the first user based at least partially on at least one of the following: an amount of payment of the first user, a reputation score of an associate of the first user and historical data associated with the first user.

16. The server of claim 15, wherein permissions are assigned to the first user based at least partially on at least one of the following: an amount of the payment of the first user, a reputation score of an associate of the first user and historical data associated with the first user.

17. A computer program product comprising a non-transitory computer usable medium embodying computer usable program code for managing data in a central repository for a plurality of users over a communications network, comprising:

computer usable program code for accepting profile data of a first user and transmitting the profile data to a third party for verification;

computer usable program code for receiving from the third party, over the communications network, a verification of the profile data of the first user;

responsive to receiving a verification of the profile data of the first user, computer usable program code for logging interactions of the first user with the central repository over the communications network, calculating a reputation score of the first user based on contributions of the first user to the central repository and consumption of data from the repository by the first user, and assigning the reputation score to a first value;

computer usable program code for logging use by other users, over the communications network, of data uploaded by the first user and calculating a second value based on: a) consumption by other users of the data uploaded by the first user, b) an amount of data consumption by other users of the data uploaded by the first user, c) a type of data uploaded by the first user, which data is consumed by other users and d) a reputation score of the other users consuming the data uploaded by the first user;

computer usable program code for receiving, over the communications network, opinions of other users about a reputation of the first user of the plurality of users and calculating a third value based on the opinions of the other users about the first user;

computer usable program code for receiving, over the communications network, verification by a third party of the data uploaded by the first user, and calculating a fourth value based on the verification;

computer usable program code for calculating a quality score for the data uploaded by the first user based at least partially on the first value, the second value, the third value and the fourth value;

computer usable program code for assigning permissions to the first user based at least partially on the reputation score of the first user, the quality score of the data uploaded by the first user and a reputation score of a business entity to which the first user is associated in the profile data of the first user;

computer usable program code for providing a first interface to the first user over the communications network, wherein the first interface allows the first user to access the data in the central repository according to the permissions of the first user;

computer usable program code for providing a second interface to the first user over the communications network, wherein the second interface allows the first user to upload data to the central repository and modify a content model of data in the central repository according to the permissions of the first user;

computer usable program code for associating a provisional status to the data uploaded by the first user via the second interface, and receiving, over the communications network, opinions of other users about a quality of the data uploaded by the first user via the second interface;

computer usable program code for responsive to receiving a predefined number of acceptances from other users of the data uploaded by the first user via the second interface upgrading the status of the data uploaded by the first users via the second interface; and computer usable program code for assigning a monetary value to the data uploaded by the first user, wherein a size of the monetary value is calculated based on an amount of data that is accessed from the central repository by the first user, a quality of the data that is accessed from the central repository by the first user, an amount of data that is uploaded to the central repository by the first user, a quality of the data that is uploaded to the central repository by the first user a quality of the data that is uploaded to the central repository by the first user.

* * * * *